Figure 1:
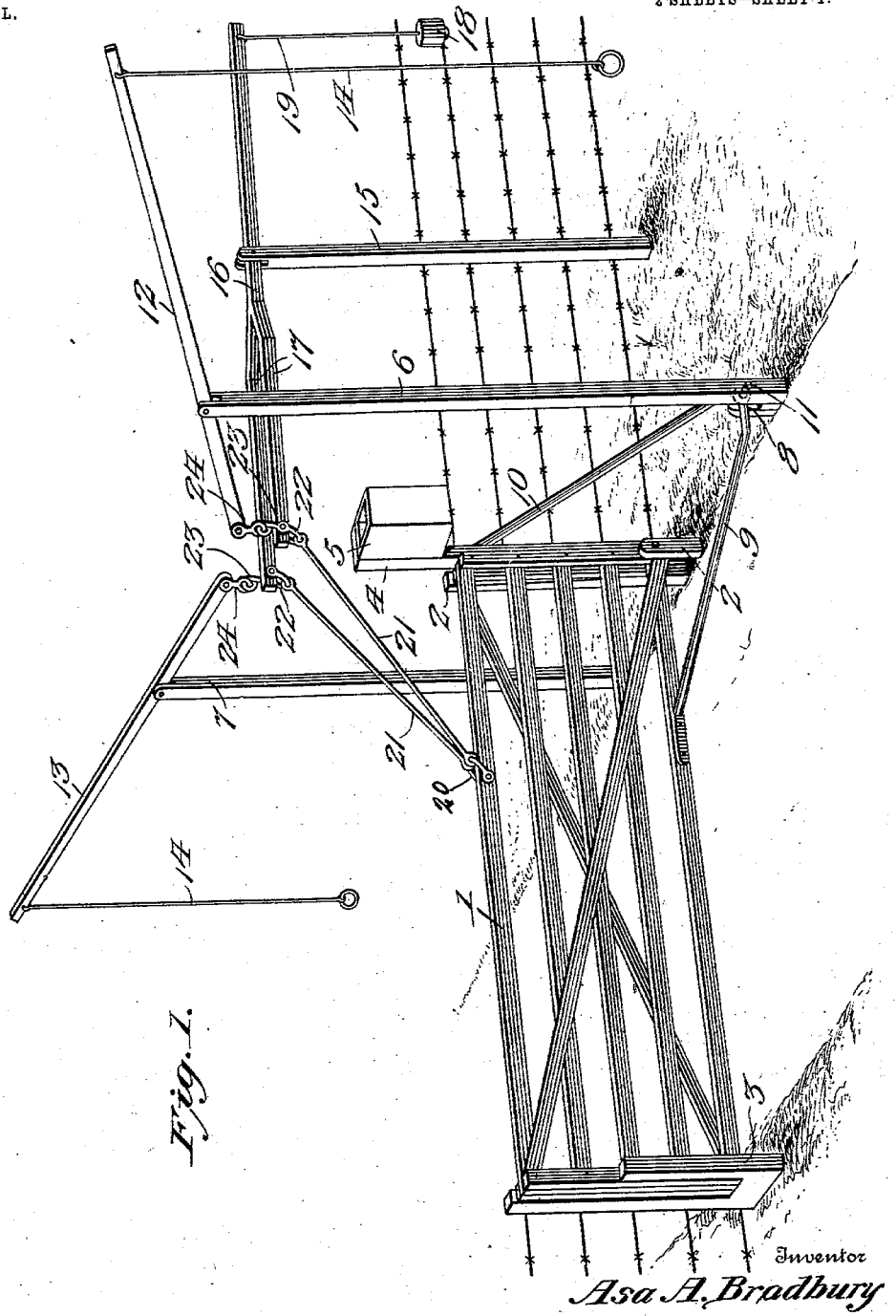

No. 753,116. PATENTED FEB. 23, 1904.
A. A. BRADBURY.
GATE.
APPLICATION FILED APR. 11, 1903.
NO MODEL. 2 SHEETS—SHEET 1.

Witnesses
Edwin G. McKee
Chas. S. Hoyer

Inventor
Asa A. Bradbury
By Victor J. Evans
Attorney

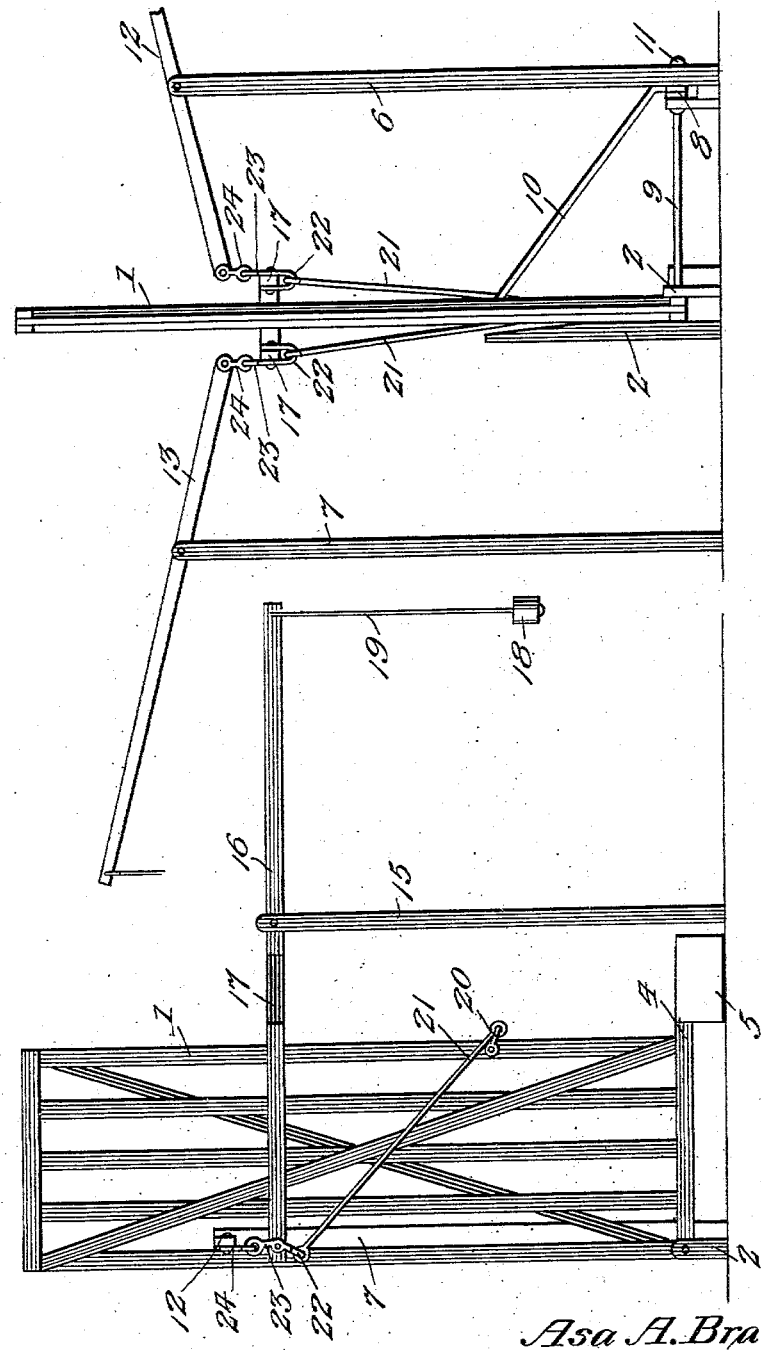

No. 753,116. Patented February 23, 1904.

UNITED STATES PATENT OFFICE.

ASA A. BRADBURY, OF EXTER, TERRITORY OF NEW MEXICO.

GATE.

SPECIFICATION forming part of Letters Patent No. 753,116, dated February 23, 1904.

Application filed April 11, 1903. Serial No. 152,223. (No model.)

*To all whom it may concern:*

Be it known that I, ASA A. BRADBURY, a citizen of the United States, residing at Exter, in the county of Union and Territory of New Mexico, have invented new and useful Improvements in Gates, of which the following is a specification.

This invention relates to improvements in gates, and especially to that class of gates which are raised and lowered through the medium of levers located at opposite sides of the gate in conjunction with weight devices, which render the operation of opening and closing the gate comparatively easy.

The primary object of the invention is to provide a simple and effective organization of contributing elements which are so arranged and operatively related that a gate may be controlled as to opening and closing movements without liability of sticking or resisting manual efforts to raise and lower the same.

A further object of the invention is to construct the operative mechanism simply, economically, and durably and in such a manner that wind, rain, snow, or ice will not interfere with its operation, and whereby, also, the operative mechanism will be noiseless, or comparatively so.

With these and other objects and advantages in view the invention consists in the construction and arrangement of the several parts, which will be more fully hereinafter described and claimed.

In the drawings, Figure 1 is a perspective view of a gate embodying the features of the invention and shown closed. Fig. 2 is a side elevation of the gate shown open. Fig. 3 is a front end elevation of the gate in open position.

Similar numerals of reference are employed to indicate corresponding parts in the several views.

The numeral 1 designates a gate of usual construction, suitably braced and pivotally secured at the lower corner portion of one end between fulcrum-posts 2, one of said posts being longer than the other and may be a fence-post, as clearly indicated by Fig. 1. The opposite end when closed fits into a vertically-slotted post 3, and one member of the latter may also serve as a fence-post. The vertically-slotted post 3 acts to hold the gate steady and in proper position when closed; but the slot in this post is of such dimensions as to permit the gate to freely move outwardly therefrom and inwardly thereinto without resistance. The inner or rear end of the gate has a support 4 rising therefrom, on which is secured a box 5 to receive stone, dirt, or other weight material to assist in opening the gate after the latter reaches a certain elevation and to maintain the gate in open position under ordinary conditions until manually operated to close the same. At a suitable distance on opposite sides of the inner or rear end of the gate uprights 6 and 7 are disposed and extend a suitable distance above the upper edge of the gate. The upright 6 has a pivot-socket 8 at its lower extremity, and therefrom extends a brace 9 diagonally to the lower rail of the gate 1. A brace 10 also extends from the socket 8 to the upper portion of the rear end of the gate, and both braces are movably held in the socket by and turn on a bolt 11. These braces 9 and 10 steady the movement of the gate and also reinforce it by relieving it of strain and avoiding an imposition of the weight on a single pivotal support. In the upper ends of the uprights 6 and 7 operating-levers 13 are pivotally mounted and extend outwardly in reverse directions, both levers having pull-cords or analogous devices 14 attached to their free ends and depending far enough to be easily reached from the ground.

At a suitable distance in rear of the inner pivoted end of the gate a post 15 is positioned, and in the upper end thereof an auxiliary operating-lever 16 is pivoted and formed with a bifurcated extremity 17, which projects over the inner end of the gate above the weight-box 5. The auxiliary operating-lever 16 projects in rear of the post 15 and has a weight 18 suspended therefrom by means of a wire or other analogous device 19. The bifurcated extremity 17 of the lever 16 is so proportioned that when the gate is raised it will move rearwardly between the opposite members or arms of said extremity, as clearly shown by Figs. 2 and 3, and by this arrangement said lever will have the necessary projection toward and over the gate to arrive at the advantageous operation sought without in the least interfering with the movement of the gate and will permit a compact assemblage of the operating parts. When the gate is closed, the auxiliary operating-lever 16 is held in horizontal position, and after the gate is opened the said lever again assumes a horizontal position through the medium of connecting mechanism, which will now be explained.

Secured to the upper rail of the gate 1 in rear of the longitudinal center is a link 20, to which the lower ends of connecting-rods 21 are movably attached. The rods 21 extend upwardly in diverging planes and are movably attached to links 22, mounted on the ends of the arms or members of the bifurcated extremity 17 of the lever 16, each link 22 having an outer upwardly-projecting arm 23, terminally attached to a link 24, depending from the adjacent end of one of the levers 12 or 13. The lever 12 is connected by its link 24 to the arm 23 of the link 22 on the arm or member of the bifurcated extremity nearest thereto, and likewise the lever 13 on the opposite side is attached to the adjacent arm 23 of the link 22 on the remaining arm or member of the extremity 17. By diverging the connecting-rods 21 and attaching them to the links 22 as set forth the end of the extremity 17 nearest the gate will always be open for movement thereinto and exit therefrom of the gate.

In operating the gate to open the same either one of the levers 12 or 13 is drawn downwardly in accordance with the direction in which the gate is operated, and this downward pull on the operated lever elevates the bifurcated extremity of lever 16 and exerts an upward pull on the top rail of the gate through the medium of both connecting-rods. The downward pull on the operated lever 12 or 13 is continued until the gate is raised high enough to permit the weight-box 5 to overthrow or counterbalance the same, when the gate will swing up to vertical position, this operation being assisted by the weight 18 on the rear end of the lever 16. As the gate moves upwardly toward a vertical position the connecting-rods 21, which are loosely attached to the link 20, assume positions on opposite sides of the gate, as clearly indicated by Fig. 2, and the parts are so proportioned that when the gate is fully raised and the rods 21 disposed on opposite sides thereof the auxiliary operating-lever 16 will be free to return to a horizontal position and simultaneously restore both levers 12 and 13 to normal position. The operator after passing through the gate or if he be in a vehicle after the latter has fully passed between the opposite terminal confines of the gate will pull downwardly on the lever 12 or 13 nearest to him to close the gate, when the same operation will ensue—that is, the bifurcated extremity 17 of the lever 16 will be elevated and an outward pull will be exerted on the gate to throw the same down into closed position, the weight-box 5 and weight 18 again coming into play after the gate has swung past a certain point to assist in the closing operation. After the gate is fully closed the bifurcated extremity 17 of the lever 16 will again assume a horizontal position, and the levers 12 and 13 will be again disposed for manual operation, as shown by Fig. 1.

The levers 12 and 13 are normally inclined downwardly and inwardly toward the bifurcated extremity 17 of the lever 16, and the shortest members of said levers are located adjacent to said extremity for obvious reasons or to obtain a greater leverage with a minimum downward pull.

The gate may be applied in connection with any kind of fence, and changes in the proportions and dimensions thereof may be resorted to without departing from the spirit of the invention.

Having thus fully described the invention, what is claimed as new is—

The combination of a gate pivotally supported at its inner end and having a counterbalancing-weight directly at the upper portion of this end, uprights on opposite sides of said pivoted end of the gate, and another upright in rear of and in alinement with the gate, operating-levers pivotally mounted on the upper ends of said opposite uprights, an auxiliary operating-lever mounted at an intermediate point thereof on the upper end of the said rear upright, and having an inner bifurcated end and a weighted outer end, said main operating-levers having their inner ends above the extremities of the said bifurcated end of the auxiliary lever, and links connecting said extremities to said inner ends of the main levers, and connecting-rods extending from said links to the upper edge of the gate, said gate having a side brace extending to and having pivotal movement on the lower part of one of said opposite uprights.

In testimony whereof I affix my signature in presence of two witnesses.

ASA A. BRADBURY.

Witnesses:
 DAVID C. JOHNSON,
 WALTER W. CLOVER.